United States Patent
Tian et al.

(10) Patent No.: US 7,360,022 B2
(45) Date of Patent: Apr. 15, 2008

(54) SYNCHRONIZING AN INSTRUCTION CACHE AND A DATA CACHE ON DEMAND

(75) Inventors: Kun Tian, Shanghai Zizhu Science Park (CN); Yaozu Dong, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 313 days.

(21) Appl. No.: 11/322,008

(22) Filed: Dec. 29, 2005

(65) Prior Publication Data
US 2007/0156969 A1 Jul. 5, 2007

(51) Int. Cl.
*G06F 13/28* (2006.01)
*G06F 13/20* (2006.01)
(52) U.S. Cl. .......................... 711/123; 711/141; 710/22
(58) Field of Classification Search ............... None
See application file for complete search history.

(56) References Cited

U.S. PATENT DOCUMENTS

| | | | | |
|---|---|---|---|---|
| 5,214,770 | A * | 5/1993 | Ramanujan et al. | 711/123 |
| 6,065,086 | A * | 5/2000 | Arimilli et al. | 710/310 |
| 6,175,930 | B1 * | 1/2001 | Arimilli et al. | 714/3 |
| 6,393,523 | B1 * | 5/2002 | Peng et al. | 711/125 |
| 6,772,294 | B2 * | 8/2004 | Civlin | 711/137 |
| 7,263,585 | B2 * | 8/2007 | Hooker | 711/140 |
| 2004/0006672 | A1 * | 1/2004 | Civlin | 711/144 |
| 2004/0068618 | A1 * | 4/2004 | Hooker | 711/141 |

FOREIGN PATENT DOCUMENTS

EP           1517232 A2 *  3/2005
WO PCT/CN2005/001909        11/2005

OTHER PUBLICATIONS

Keir Fraser, et al., "Safe Hardware Access With The Xen Virtual Machine Monitor," Published at the OASIS ASPLOS 2004 workshop, pp. 1-10.
Thomas Wolfgang Burger, "Cache Coherency in Itanium Processor Software," May 2005, pp. 1-9.

* cited by examiner

*Primary Examiner*—Kevin Verbrugge
(74) *Attorney, Agent, or Firm*—Trop, Pruner & Hu, P.C.

(57) ABSTRACT

In one embodiment, the present invention includes a method for performing a direct memory access (DMA) operation in a virtualized environment to obtain a page from a memory and store the page in a data cache, and synchronizing the page in the data cache and an instruction cache if the page implicates instruction information, otherwise not synchronizing the page. In this manner, synchronizations may be performed on demand. Other embodiments are described and claimed.

24 Claims, 5 Drawing Sheets

SYNCHRONIZING AN INSTRUCTION CACHE AND A DATA CACHE ON DEMAND

BACKGROUND

Embodiments of the present invention relate generally to data processing, and more particularly to cache management operations, particularly in a virtualized environment.

Conventional operating systems (OS) that operate in a system typically assume that the OS has complete and direct control of hardware and system resources. The OS implements the policies to manage these resources to allow multiple user-level applications to be run. Virtualization allows multiple instances of OSs to be run on a system. The OSs can be the same or different versions, and can come from different OS vendors. In a typical virtualized environment, certain system software is responsible for virtualizing the hardware and system resources to allow multiple instances of the OSs (referred to herein as "guest OSs") to be run. The software component that provides such functionality is referred to herein as a virtual machine monitor (VMM). The VMM is typically host software that is aware of the hardware architecture of the system.

For each instance of a guest OS, the VMM creates and presents a virtual machine (VM) to the guest OS. From the perspective of a guest OS, the VM includes all the hardware and system resources (e.g., processors, memory, disks, network devices, etc.) expected by the guest OS. From the VMM perspective, these hardware and system resources are thus "virtualized".

Virtualized environments include fully-virtualized environments and para-virtualized environments. In a fully-virtualized environment, each guest OS operates as if its underlying VM is an independent physical processing system that the guest OS supports. Accordingly, the guest OS expects the VM to behave according to the architecture specification of the supported physical processing system. In contrast, in a para-virtualized environment, the guest OS helps the VMM to provide a virtualized environment. Accordingly, the guest OS may be characterized as virtualization aware. For instance, a para-virtualized guest OS may be able to operate only in conjunction with a particular VMM, while a guest OS for a fully-virtualized environment may operate on different types of VMMs.

In a fully-virtualized environment, one or more device models may be present, which are software running in the VMM, service domain, or even in the guest itself that perform driver-type operations in the fully-virtualized environment. Such device models may be present in a user-level application, a guest OS or a hypervisor, such as a VMM. In a para-virtualized environment, such driver-type operations may be implemented using a virtual device driver service running in the service domain such as a back-end driver. This too may be software that can be located in a user application, guest OS or VMM. A service domain that performs driver-type operations is called a driver domain.

As an example of a virtualized environment, a VMM may create a first VM that presents two logical processors to one guest OS, and a second VM that presents one logical processor to another guest OS. The actual underlying hardware, however, may includes less than, equal to, or greater than three physical processors. The logical processors presented to a guest OS are called virtualized processors. Likewise, VMs may include virtualized storage, peripherals, and the like.

A VMM may use emulation to perform certain operations on behalf of guest software, which includes both guest OSs, as well as applications running on top of the OSs. For instance, guest software may seek to perform a direct memory access (DMA) operation to access data from a memory directly without processor involvement. However, since a DMA controller is a virtualized resource, the VMM or driver software running on top of the VMM may emulate the DMA operation.

Because such DMA operations occur without help of a processor, the system needs to maintain coherency between an instruction cache and a data cache. To do this, signals on a bus, such as so-called snoop cycles are used to invalidate cacheable pages that a DMA access modifies. Thus in a VMM environment, a guest OS that issues DMA read operations expects to see instruction and data caches to be synchronized when the operation is completed as in a native system operation. However, when performed by emulation, such DMA read operations cache data into a data cache but not into an instruction cache.

These DMA read operations cache data only in a data cache because a device model or background virtual device driver service that performs the DMA operation via emulation typically executes physical DMA operations with an internal buffer, and then copies the buffer to a location provided by the guest.

Problems result if the guest OS seeks to use a DMA operation to load an executable image and execute the code after the DMA operation. Thus, instruction and data caches are typically synchronized each time a guest-initiated DMA operation is completed. However this results in redundant operations and bus cycles. As a result, performance is degraded since many such DMA operations are for data only and thus coherency between instruction and data caches is not needed.

DETAILED DESCRIPTION

In various embodiments, synchronization between an instruction cache (I-cache) and a data cache (D-cache) may be performed on demand, also referred to herein as a lazy synchronization. More specifically, in a virtualized environment when a direct memory access (DMA) operation is emulated, pages of data read and stored in a D-cache, for example, need not be synchronized if the page is for data operation only. In this way, processor cycles and bus cycles both may be reduced, as only data accesses that implicate instruction information are synchronized.

In various embodiments, synchronization on demand may occur at different times and may be performed by different agents. For example, in a virtualized environment synchronization on demand may be performed by a DMA emulator, such as a device model or a virtual machine monitor (VMM). More specifically, upon performance of a DMA read operation via emulation, the device model may determine whether a page read has been previously mapped for instruction information. If so, the device model may perform an immediate synchronization between I- and D-caches, otherwise it does not perform the synchronization. If the device model does not perform a synchronization, a virtual machine monitor (VMM) or other virtualized monitor may perform a synchronization if the page is later implicated for instruction information, e.g., via an instruction translation lookaside buffer (I-TLB) insertion for the page.

While various manners of implementing explicit synchronizations only for selected DMA emulation operations can occur, some embodiments may use flags or other indicators in a shared buffer to determine whether to synchronize on demand. As an example, a shared buffer can be accessed both by a guest application running in a virtual machine and a VMM. In certain implementations, the size of the shared buffer may vary and may depend upon an amount of virtualized memory available in the virtualized environment. Furthermore, the type of indicators present in the shared buffer may vary. However, in one embodiment the shared buffer may include multiple entries, each having two indicators. Each entry may correspond to a page of the virtualized memory, with each indicator in the entries writable by a first agent and readable by a second agent. In this way, both agents can access the information in the shared buffer and provide indications to the other agent regarding a state of the associated page.

Figure 1:
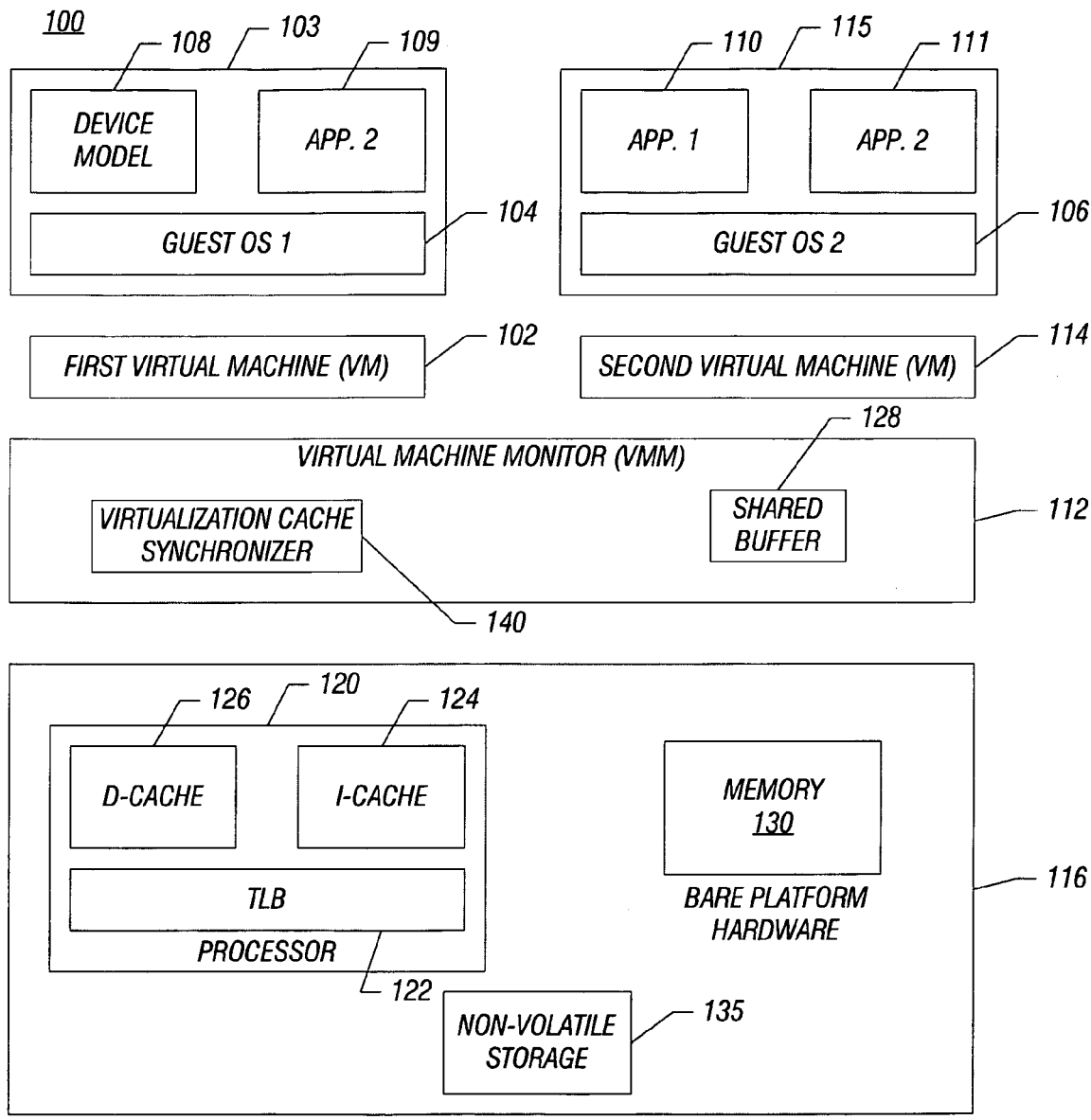
FIG. 1 is a block diagram of a system having a virtual machine environment in accordance with one embodiment of the present invention.

Referring now to FIG. 1, shown is a block diagram of a system having a virtual machine environment in accordance with one embodiment of the present invention. In the embodiment of FIG. 1, virtual machine environment 100 includes bare platform hardware 116 (hereafter "platform hardware") that may be a computing platform such as any type of computer system. Hardware 116 may execute a standard operating system (OS) or a virtual machine monitor (VMM) such as a VMM 112. VMM 112 may emulate and export a bare machine interface to guest software. Such higher-level software may be a standard or real-time OS or the like. In other embodiments, VMM 112 may be run within or on top of another VMM.

Platform hardware 116 may be of a personal computer, server, wireless device, portable computer, set-top box, or the like. As shown in FIG. 1, platform hardware 116 includes a processor 120, memory 130, and a non-volatile storage 135. Of course, other platform hardware, such as input/output (I/O) devices, controllers, peripherals, and the like may also be present.

Processor 120 may be a general-purpose processor such as a microprocessor, digital signal processor (DSP), microcontroller or the like. Processor 120 may include microcode, programmable logic or hard-coded logic to perform embodiments of the present invention. While shown with only a single processor in the embodiment of FIG. 1, it is to be understood that embodiments of the present invention may be used in connection with multiprocessor systems such as a chip multiprocessor (CMP) or another multiprocessor system such as a symmetric multiprocessor (SMP) system.

As shown in FIG. 1, processor 120 may include a translation lookaside buffer (TLB) 122. TLB 122 may include multiple TLBs such as an instruction TLB and a data TLB. TLB 122 may store recently used translations from virtual addresses to physical addresses to avoid time-consuming accesses to main memory (e.g., memory 130). Processor 120 further includes an instruction cache (I-cache) 124 and a data cache (D-cache) 126. While shown as separate memories in the embodiment of FIG. 1, it is to be understood that instruction and data caches may be combined in different embodiments.

Memory 130 may be a volatile storage, such as a random access memory (RAM) such as a dynamic RAM (DRAM), read only memory (ROM) or the like. Furthermore, a non-volatile storage 135, which may be, for example a flash memory, hard disk drive or the like, may also be present.

VMM 112 presents to other software (i.e., guest software) the abstraction of one or more virtual machines (VMs). VMM 112 may provide the same or different abstractions to the various guests. While FIG. 1 shows two such VMs 102 and 114, it is to be understood that more or fewer VMs may be supported by a VMM in accordance with an embodiment of the present invention. In the embodiment of FIG. 1, first VM 102 may be a driver virtual machine, while second VM 114 may be a user virtual machine. The driver VM may have a special privilege level to service the user VM. Accordingly, first VM 102 may perform driver-type operations in response to requests for certain activities by second VM 114.

Each VM may have guest software running thereon, including, for example a guest OS and various guest software applications. Thus as shown in FIG. 1, first VM 102 includes a first guest OS 104 and first and second guest software applications 108 and 109. In the embodiment of FIG. 1, first application 108 may correspond to a device model, which represents the virtual platform/devices to the user VM. In the embodiment of FIG. 1, the device model may thus reside as a user-level application running in the driver VM, however in other embodiments the device model may be implemented in VMM 112 or first guest OS 104. Similarly, second VM 114 includes a second guest OS 106 and first and second guest software applications 110 and 111. Collectively, guest OS and software applications are referred to herein as guest software 103 and 115.

Guest software 103 and 115 expect to access physical resources (e.g., processor registers, memory and I/O devices) within VMs 102 and 114 on which the guest software is running. VMM 112 facilitates access to such resources, while retaining ultimate control over these resources within platform hardware 116. The resources sought to be accessed may be classified as privileged or non-privileged. For privileged resources, VMM 112 may facilitate functionality desired by guest software 103 and 115 while retaining ultimate control over these privileged resources. Non-privileged resources may be accessed directly via guest software 103 and 115, in some implementations.

As further shown in FIG. 1, VMM 112 includes a virtualization cache synchronizer 140, which may be used-by VMM 112 to perform lazy synchronization of I- and D-caches when an I-TLB insertion operation is requested for a cached page not previously synchronized. A shared buffer 128, which may be a software-managed structure allocated from VMM 112, may store status information used by both VMM 112 and device model 108 to determine whether to perform a synchronization on demand.

Figure 2:
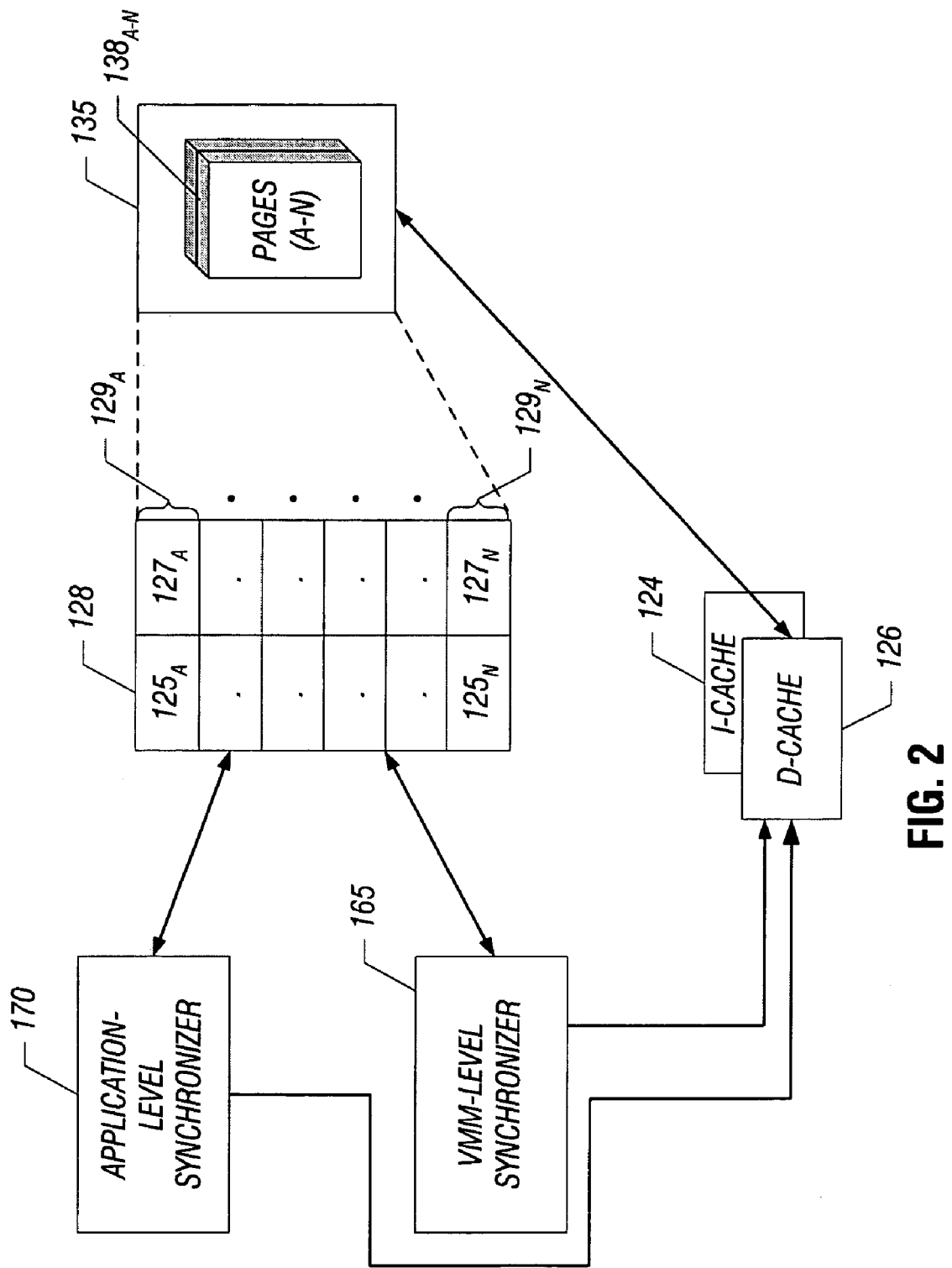
FIG. 2 is a block diagram showing the interaction between software and hardware to effect synchronizations on demand in accordance with one embodiment of the present invention.

Referring now to FIG. 2, shown is a block diagram showing the interaction between software and hardware to effect synchronizations on demand in accordance with one embodiment. As shown in FIG. 2, synchronizations may be performed using two different synchronizers, namely an application-level synchronizer 170 and a VMM-level synchronizer 165. Application-level synchronizer 170 may be implemented in a device model in one embodiment, while VMM-level synchronizer 165 may be implemented in a VMM. As shown in FIG. 2, both synchronizers may communicate with a shared buffer 128 that includes a plurality of entries $129_A$-$129_N$ (generically entry 129). Each entry 129 includes one of a first status indicator $125_A$-$125_N$ (generically status indicator 125) and one of a second status indicator $127_A$-$127_N$ (generically second status indicator 127). Note that while shown with a single pair of indicators per entry in the embodiment of FIG. 2, in embodiments used in multiprocessor systems, each entry 129 may include a first indicator 125 and a second indicator 127 per guest processor. As will be described further below, each entry 129 may be for a per (VMM-managed) page.

In one embodiment, first status indicator 125 may be accessed by application-level synchronizer 170 and written by VMM-level synchronizer 165. In this embodiment, first status indicator 125 may provide an indication of whether the corresponding page is mapped by a guest I-side TLB. In turn, second status indicator 127 may be accessed by VMM-level synchronizer 165 and written by application-level synchronizer 170. In this embodiment, second status indicator 127 may provide an indication of whether the corresponding page is synchronized in I- and D-caches. In some embodiments, VMM-level synchronizer 165 may also write to second status indicator 127.

Still referring to FIG. 2, shared buffer 128, and more particularly each entry 129 corresponds to a page of a memory 135, which in various embodiments may be main memory, flash memory, a disk drive or the like. As shown, memory 135 may be segmented into a plurality of pages $138_A$-$138_N$ (generically page 138). When software requests access to one or more pages from memory 135, the pages(s) may be provided to a cache memory. More particularly, as shown in FIG. 2, pages may be provided to a D-cache 126, which is coupled to an I-cache 124. To reduce the overhead of synchronizations, when pages are written into D-cache 126, a synchronization does not necessarily occur. Instead, synchronizations may be performed on demand, i.e., in a lazy manner.

In a virtual machine environment, a DMA request from a user VM is trapped by the VMM and delivered to a device model for DMA emulation. Accordingly, in the embodiment of FIG. 2, the device model performs a DMA read operation to obtain one or more pages 138 from memory 135 and provide them to D-cache 126. Then application-level synchronizer 170, which may reside in the device model, may check shared buffer 128 to determine whether the corresponding page or pages is mapped to code. More specifically, in one embodiment, first indicator 125 of an entry 129 in shared buffer 128 corresponding to the page(s) may be checked to determine if a code mapping exists for the page. If so, application-level synchronizer 170 may initiate an immediate synchronization to cause I-cache 124 and D-cache 126 to be synchronized with respect to this page. If instead application-level synchronizer 170 determines from entry 129 corresponding to the page that the page is not mapped as code, application-level synchronizer 170 will mark second indicator 127 of entry 129 corresponding to the page as unsynchronized and will not perform an immediate synchronization.

Later, during other operations when a TLB insertion by a guest causes an exit to the VMM (i.e., a virtual machine (VM) exit), VMM-level synchronizer 165 may determine whether a synchronization on demand is to be performed. More specifically, upon receipt of control by a VMM pursuant to a guest's TLB insertion operation, VMM-level synchronizer 165 accesses shared buffer 128 for an entry 129 corresponding to the page of the insertion. If the insertion operation is an instruction-side TLB insertion, VMM-level synchronizer 165 determines whether second indicator 127 corresponding to the page is indicated as unsynchronized. If so, VMM-level synchronizer 165 initiates a synchronization on demand for the given page in I-cache 124 and D-cache 126. Of course, if the page is indicated as being synchronized, no synchronization is performed. In either event, first indicator 125 of entry 129 corresponding to the given page is set to indicate that the page is mapped for code. Still further, VMM-level synchronizer 165 may also set second indictor 127 of entry 129 corresponding to the given page to indicate that the page is now synchronized.

Figure 3:
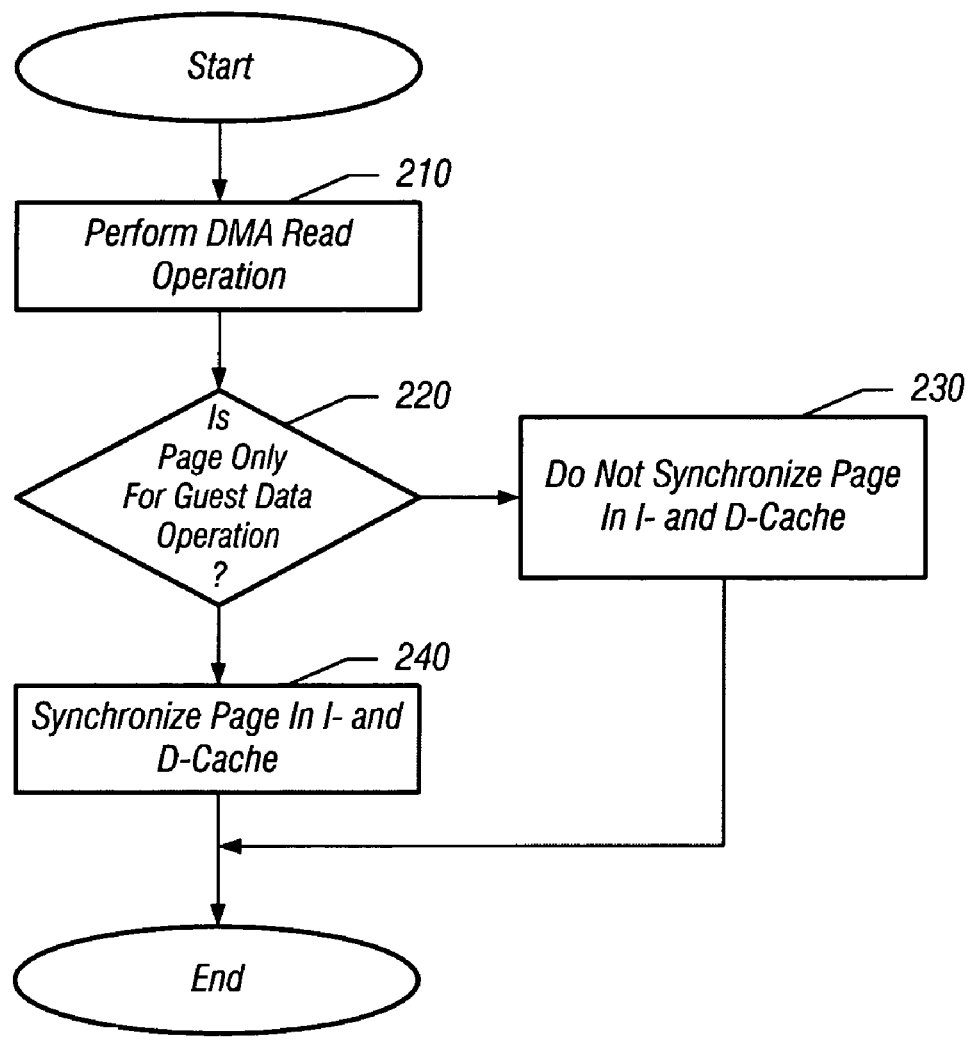
FIG. 3 is a flow diagram of a method in accordance with one embodiment of the present invention.

Referring now to FIG. 3, shown is a flow diagram of a method in accordance with one embodiment of the present invention. As shown in FIG. 3, method 200 corresponds to a high-level view of a synchronization on demand operation in accordance with an embodiment of the present invention. Method 200 may begin by performing a DMA read operation (block 210). More specifically, a guest application, e.g., a device model may emulate a DMA operation that is performed by a hardware DMA controller. In this way, data desired to be read from a memory can be loaded without consuming processor resources. As an example, a DMA read operation may be performed to read information from disk (i.e., a disk read) and store the information to a storage more closely coupled to the processor (e.g., a cache memory). More specifically, the DMA operation may load data into a D-cache.

Next, it may be determined whether a page of data read in is only for guest data operation (diamond 220). That is, it may be determined whether any information in the page is to be used for instruction purposes (e.g., instruction code) or whether the information is only data. If it is determined that the page is only applicable as data at that time, the I- and D-caches are not synchronized (block 230). Accordingly, the overhead associated with such synchronization is avoided. Note that in many implementations, the majority of DMA read operations implicate data only, and thus significant overhead may be reduced by not performing synchronizations.

Still referring to FIG. 3, if instead at diamond 220 it is determined that instruction information may be present in the page, control passes to block 240. There the I- and D-caches are synchronized. As will be discussed further below, such synchronizations may maintain coherency between these separate caches. While described with this particular implementation in the embodiment of FIG. 3, it is to be understood that the scope of the present invention is not so limited.

Figure 4:
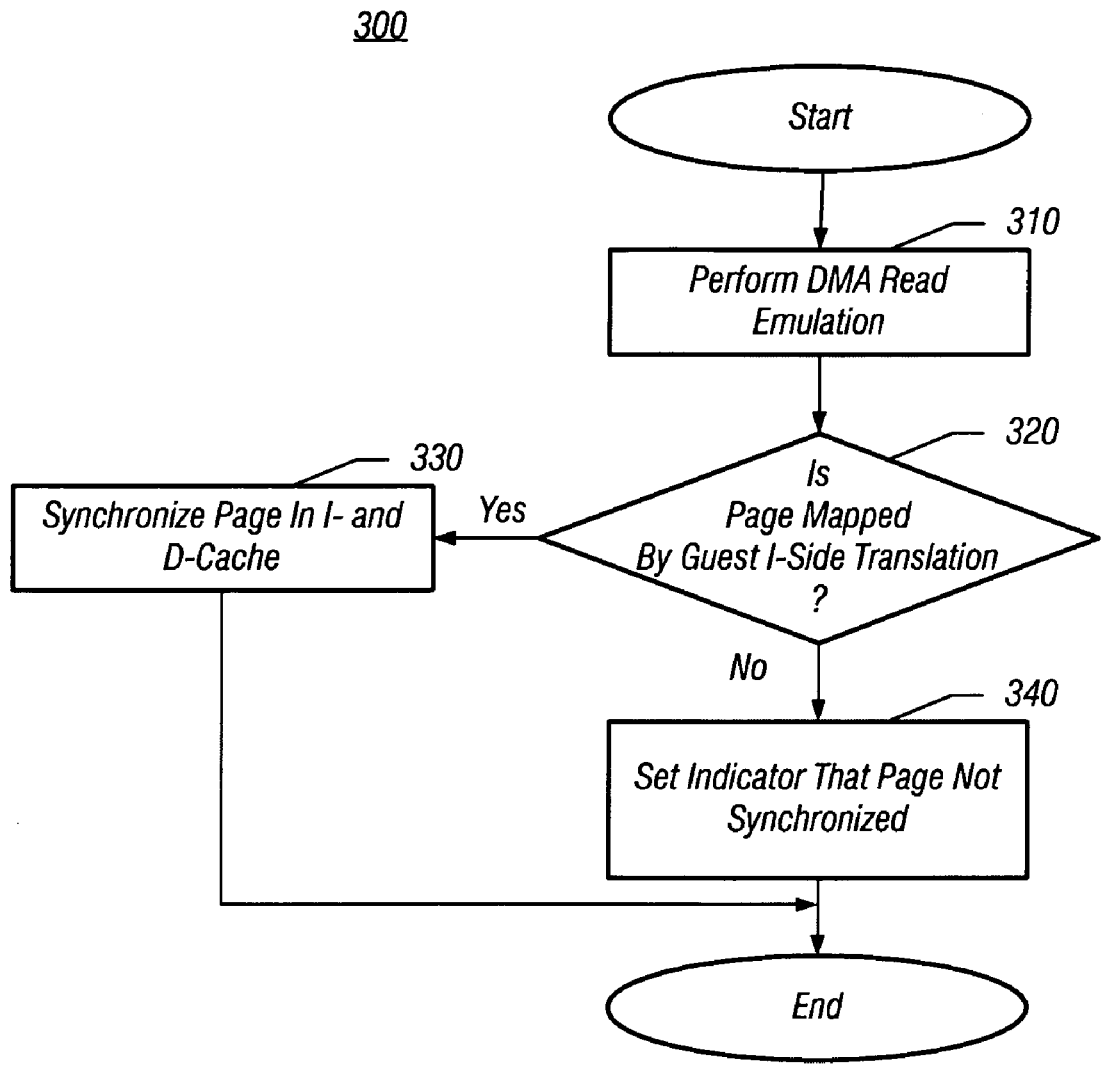
FIG. 4 is a flow diagram of a first synchronization method in accordance with an embodiment of the present invention.

Different implementations of determining whether to perform a lazy synchronization can be effected. Referring now to FIG. 4, shown is a flow diagram of a method in accordance with an embodiment of the present invention. As shown in FIG. 4, method 300 may effect synchronizations on demand in the context of a DMA operation, e.g., via a device model. Method 300 may begin by performing a DMA read emulation (block 310). More specifically, a device model may receive control from a VMM when guest software issues a DMA request. Such a request is intercepted by the VMM and transferred to the driver VM, and more particularly to the device model to emulate a DMA operation to read information from, e.g., disk. The information read may be stored in a cache, and more specifically a data cache.

Next it may be determined if a page corresponding to the information read from disk is mapped by a guest instruction-side translation (diamond 320). That is, if the page is already mapped with an I-side translation, the D-cache and I-cache should be synchronized. While different manners of determining whether the page is subject to a prior I-cache translation, in one embodiment a first indicator in a shared buffer may be accessed to determine the presence of a prior I-side translation for the page. Accordingly, in such an embodiment, the device model may access the shared buffer to determine the status of this indicator. If this first indicator indicates presence of an I-side translation, control passes to block 330. There the page may be synchronized in the I- and D-caches (block 330). If instead no I-side translation is present, control passes to block 340. There a second indicator may be set to indicate that the page is not synchronized (block 340). Thus the page is not synchronized, and to provide that status to, e.g., the VMM, the second indicator in the shared buffer may be set. More particularly, the device model may set the second indicator associated with the page in the shared buffer to indicate the unsynchronized status of the page.

Thus the device model performs a lazy synchronization if the page read was previously mapped as code. If not, no synchronization is performed upon the DMA read emulation performed by the device model and accordingly, method 300 concludes. While shown with this particular implementation in the embodiment of FIG. 4, it is to be understood that the scope of the present invention is not so limited. Note that method 300 may be iteratively performed for each page read during a DMA operation. Alternately, all such pages may be read in and then a determination may be made by the device model whether to perform synchronizations on demand for one or more of the pages read.

Figure 5:
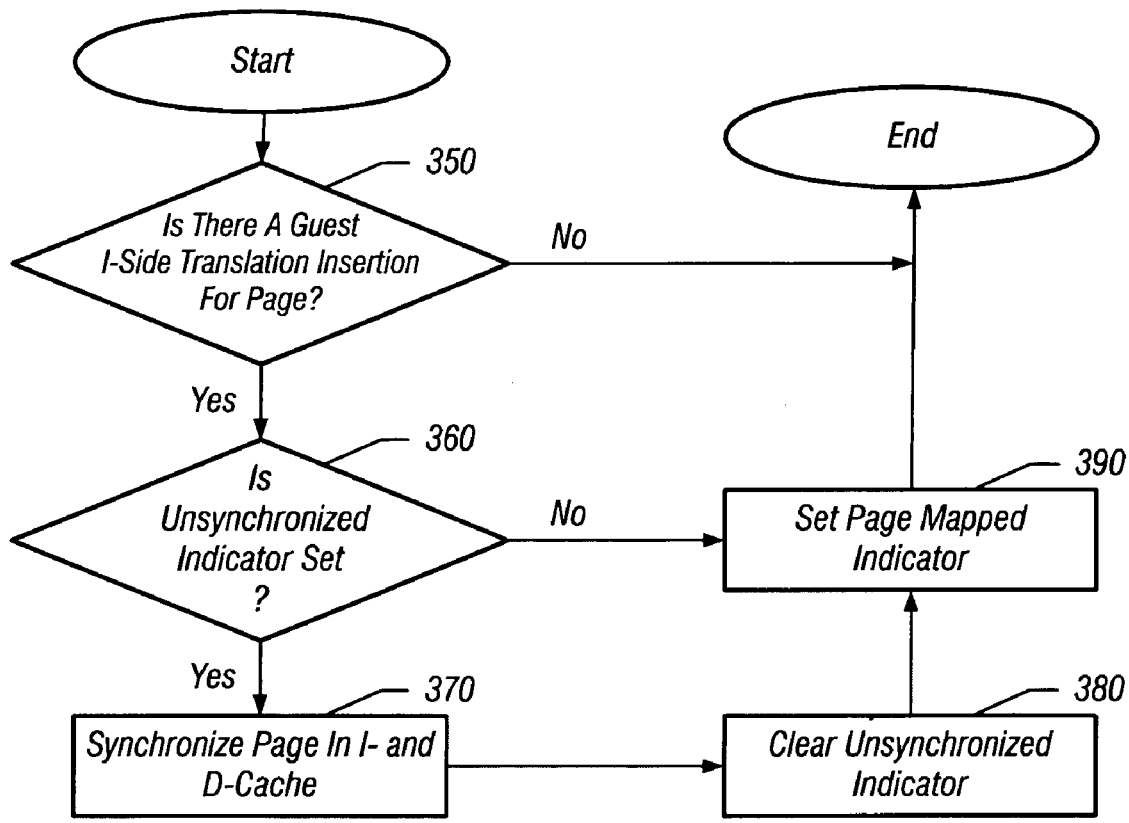
FIG. 5 is a flow diagram of a second synchronization method in accordance with an embodiment of the present invention.

Referring now to FIG. 5, shown is a flow diagram of a method in accordance with an embodiment of the present invention. More specifically, method 345 may effect synchronizations on demand in the context of a VMM. Note that method 345 may typically begin execution when a new I-side TLB is inserted. Upon such an event, the VMM may determine whether there is a guest I-side translation insertion for a given page (diamond 350). For example, during normal operation assume guest software seeks to insert an I-cache translation corresponding to the page. This TLB insertion operation thus causes an exit to the VMM so that the VMM can perform this privileged operation. As such the VMM performs diamond 350 during the course of its normal execution. If no such translation insertion is received, method 300 may conclude.

If instead at diamond 350 a translation insertion is received corresponding to a given page, control passes to diamond 360. There, it may be determined whether the unsynchronized indicator (i.e., the second indicator) corresponding to the page is set. For example, the VMM may access this second indicator of the entry corresponding to the given page in the shared buffer to determine its status. If the page has not been previously synchronized (i.e., by the device model during DMA emulation time), control passes to block 370, where the page is synchronized in the I- and D-caches. After such synchronization in block 370, control passes to block 380. There, to indicate the synchronized status, the VMM may again access the second indicator in the shared buffer corresponding to this page and clear its status to indicate the synchronized status (block 380).

Then, from either of block 380 or diamond 360, control passes to block 390. There, the VMM may set the page-mapped indicator (i.e., the first indicator) to indicate the presence of an entry in an I-TLB corresponding to the page (block 390). Accordingly, the VMM writes the first indicator of the entry corresponding to the given page in the shared buffer to thus set the page-mapped indicator. At this point method 345 concludes. Note that while shown in FIG. 5 for a single guest processor, it is to be understood that method 345 may be performed per guest processor in a multiprocessor environment. While described with this particular implementation in the embodiment of FIG. 5, it is to be understood that the scope of the present invention is not limited in this regard.

Thus in many embodiments, synchronization may be performed on demand. If a page a disk DMA operation reads is for guest data operation only, a synchronization is not performed to reduce both processor cycles and bus cycles. If the page is tracked and used for a guest instruction-side page, either at device model DMA operation emulation time or later when an instruction TLB insertion occurs, a synchronization may be explicitly performed.

Synchronization on demand can save unnecessary processor time used to explicitly synchronize an I-cache and a D-cache in a local processor or other logical processor in a platform. Such explicit synchronizations can be especially expensive in a SMP system, which is much more sensitive to global synchronizations. Synchronization on demand is complicated by the fact that the device model does not know if a page read is for guest code or data (as only the VMM has this knowledge). Meanwhile, the VMM does not know if a page previously read is by DMA operation or not (as this is the device model's knowledge). Accordingly, a co-operative device model including a data structure to hold information of guest usage and device model operation based on each guest physical page may be used.

The pseudocode of an algorithm in accordance with one embodiment is set forth in Table 1. Note that the pseudocode of Table 1 is with respect to a single processor system. However, the pseudocode may be extended to support multiple processors such as present in a SMP system.

TABLE 1

```
Data structure
    Is_codemap_page[MAX_GUEST_PAGES]:
            True or false indicating whether the page is mapped
            by a guest I-side TLB.
    Icache_not_synced_page[MAX_GUEST_PAGES]:
            True or false indicating whether the page is
            synchronized.
When Device Model completes DMA operation of a guest page read:
    /*
    * If the page is already mapped by a guest I-side translation,
    synchronize it now.
    * Otherwise set the Icache_not_synced_page flag to let VMM
    synchronize on demand
later.
    */
    If ( Is_codemap_page[guest_page_number] ) {
            // do explicit synchronization for that page.
            For ( addr= page_start_addr; addr < page_end_addr;
            addr +=
CACHE_LINE_SIZE ) {
                    fc.i addr;
            }
    sync.i
    srlz.i
    }
    Else {
            // set flag to indicate non-synchronized status wait for
            synchronization.
            Icache_not_synced_page[guest_page_number] =
            TRUE;
    }
When VMM tracks a guest I-side TLB insertion.
    /*
    * If the page is not synchronized after device model's DMA
    operation,
    * synchronize it explicitly now, otherwise set
```

TABLE 1-continued

```
        is_codemap_page flag to let
        * Device Model be aware of the I-side map.
        */
    If ( Icache_not_synced_page[guest_page_number] ) {
            // do explicit synchronization
                For ( addr= page start addr; addr < page_end_addr;
                    addr +=
CACHE_LINE_SIZE ) {
                    fc.i addr;
                }
                sync.i
                srlz.i
                // clear the flag
                Icache_not_synced_page[guest_page_number] =
                FALSE;
            }
    Is_codemap_page[guest_page_number] = TRUE;
```

As shown in Table 1, the expense of synchronizations, which includes explicit flushes of data from instruction and data caches, along with serialization along instruction boundaries, can be avoided unless cached data implicates instruction information. Code such as that set forth above or in accordance with the methods set forth in FIGS. 3-5 may provide for software-based and/or hardware-based full virtualization VMM, with improved guest disk DMA operation performance.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
performing a direct memory access (DMA) operation in a virtualized environment to obtain a page from a memory and store the page in a data cache; and
synchronizing the page in the data cache and an instruction cache if the page implicates instruction information, otherwise not synchronizing the page.

2. The method of claim 1, further comprising determining whether the page implicates the instruction information.

3. The method of claim 2, wherein determining whether the page implicates the instruction information comprises checking whether the page is mapped with an instruction translation by a guest software.

4. The method of claim 3, wherein checking whether the page is mapped comprises accessing a first indicator of an entry of a shared buffer, the entry corresponding to the page.

5. The method of claim 2, wherein determining whether the page implicates the instruction information comprises receiving an instruction translation lookaside buffer (I-TLB) insertion operation for the page from a guest software.

6. The method of claim 5, further comprising determining if the page is synchronized in the data cache and the instruction cache after receiving the I-TLB insertion operation by accessing a second indicator of an entry of a shared buffer, the entry corresponding to the page.

7. The method of claim 6, further comprising synchronizing the page in the data cache and the instruction cache if the page is determined not to be synchronized.

8. The method of claim 5, further comprising writing a first indicator in an entry of a shared buffer corresponding to the page after receiving the I-TLB insertion operation.

9. An article comprising a machine-accessible medium including instructions that when executed cause a system to:
read a page of information from a storage medium into a data cache;
determine if the page is for code execution; and
synchronize the page in the data cache and an instruction cache if the page is for code execution, otherwise to not synchronize the page.

10. The article of claim 9, further comprising instructions that when executed cause the system to access a first flag in an entry of a shared buffer corresponding to the page and to synchronize the page based on the first flag.

11. The article of claim 10, further comprising instructions that when executed cause the system to write a second flag in the entry if the page is not synchronized.

12. The article of claim 9, further comprising instructions that when executed cause the system to access a second flag in an entry of a shared buffer corresponding to the page and to synchronize the page based on the second flag, if the page is subjected to an instruction-translation lookaside buffer insertion operation.

13. The article of claim 12, further comprising instructions that when executed cause the system to write a first flag and to update the second flag in the entry after the synchronization.

14. An apparatus comprising:
an instruction cache to store pages including code;
a data cache to store pages including data; and
a shared buffer coupled to the instruction cache and the data cache, the shared buffer including entries each corresponding to one of a plurality of pages in a storage medium coupled to at least the data cache, wherein each of the entries includes status information regarding a synchronization state of the corresponding page in the instruction cache and the data cache.

15. The apparatus of claim 14, further comprising a first synchronizer to execute in a virtual machine monitor (VMM), the first synchronizer to synchronize a page in the instruction cache and the data cache based on the synchronization state of the page.

16. The apparatus of claim 15, wherein each of the entries further includes status information regarding a code mapping status of the corresponding page in the data cache.

17. The apparatus of claim 16, further comprising a second synchronizer to execute in a driver virtual machine (VM), the second synchronizer to synchronize a page in the instruction cache and the data cache based on the code mapping status of the page.

18. A system comprising:
an instruction cache to store instruction information;
a data cache coupled to the instruction cache to store data; and
a synchronizer coupled to the instruction cache and the data cache to synchronize a page in the instruction cache and the data cache if the page implicates instruction information, wherein the synchronizer is to not synchronize the page if the page is for data only.

19. The system of claim 18, further comprising:
a storage medium coupled to the data cache, wherein the storage medium is to store a plurality of pages; and
a shared buffer coupled to the synchronizer, the shared buffer to store a plurality of entries each corresponding to one of the plurality of pages of the storage medium.

20. The system of claim 19, wherein each of the plurality of entries includes a first indicator indicative of a mapping status of the corresponding page and a second indicator indicative of a synchronization status of the corresponding page.

21. The system of claim 20, wherein the synchronizer includes:
a first synchronizer to execute in a driver virtual machine (VM), the first synchronizer to determine whether to synchronize the corresponding page based on the first indicator; and
a second synchronizer to execute in a virtual machine monitor (VMM), the second synchronizer to determine whether to synchronize the corresponding page based on the second indicator.

22. The system of claim 21, wherein the first synchronizer is to write to the second indicator when the driver VM performs a direct memory access (DMA) operation for the corresponding page and the first indicator is indicative of the corresponding page being code mapped.

23. The system of claim 22, further comprising a device model to perform the DMA operation in the driver VM to read the corresponding page from the storage medium to the data cache.

24. The system of claim 21, wherein the second synchronizer is to write to the first indicator when a guest software issues an instruction translation lookaside buffer (TLB) insertion operation for the corresponding page.

* * * * *